United States Patent [19]

Beshai et al.

[11] Patent Number: 5,629,930
[45] Date of Patent: May 13, 1997

[54] CALL ROUTING IN AN ATM SWITCHING NETWORK

[75] Inventors: Maged E. Beshai, Stittsville; James Yan, Nepean, both of Canada

[73] Assignee: Northern Telecom Limited, Montreal, Canada

[21] Appl. No.: 551,018

[22] Filed: Oct. 31, 1995

[51] Int. Cl.$^6$ .............................. H04J 3/24; H04L 121/54
[52] U.S. Cl. ............................................. 370/396; 370/412
[58] Field of Search .............................. 370/54, 53, 58.1, 370/58.2, 58.3, 60, 60.1, 16, 16.1, 13, 94.3, 94.2; 340/825.03, 826, 827, 825.1, 825, 825.01; 379/268, 269, 270, 271, 272, 273, 280

[56] References Cited

U.S. PATENT DOCUMENTS

| | | | |
|---|---|---|---|
| 4,679,189 | 7/1987 | Olson et al. | 370/60 |
| 5,295,137 | 3/1994 | Jurkevich | 370/54 |
| 5,355,364 | 10/1994 | Abali | 370/54 |
| 5,430,729 | 7/1995 | Rahnema | 370/60 |

*Primary Examiner*—Wellington Chin
*Assistant Examiner*—Huy D. Vu
*Attorney, Agent, or Firm*—Yoshiharu Toyooka

[57] ABSTRACT

A routing scheme for an ATM switching network includes a plurality of switching nodes, each of which includes individual storage for storing routing messages for each outgoing link. A call at a source node is routed through one possible routing path which requires only one or two links to complete a connection to a destination node. In such case, one of the routing paths is selected based on link state information concerning only the possible routing paths. If the call requires a route path which includes three or more links to the destination node, the source node performs a predefined sequential routing to its neighboring node before the neighboring node negotiates with selected intermediate nodes for a connection involving two links. The routing messages stored at each node are processed independently and simultaneously by each node. The main requirement is that routing decisions must be based on true link-state information. A protocol is devised for fast and efficient bulk processing while avoiding protential deadlocks.

15 Claims, 5 Drawing Sheets

Candidate routes

| Request No. | from/to | Candidate routes |
|---|---|---|
| 1 | 9 / 2 | 9, 8, 2 ‖ 9, 10, 2 |
| 2 | 8 / 3 | 8, 1, 3 ‖ 8, 2, 3 |
| 3 | 8 / 4 | 8, 1, 4 ‖ 8, 5, 4 |
| 4 | 4 / 7 | 4, 1, 7 |
| 5 | 4 / 8 | 4, 1, 8 ‖ 4, 5, 8 |
| 6 | 3 / 9 | 3, 2, 8, 9 ‖ 3, 2, 10, 9<br>3, 1, 8, 9 |

Fig 14

CALL ROUTING IN AN ATM SWITCHING NETWORK

FIELD OF THE INVENTION

The present invention is directed to an ATM switching network. In particular, it is directed to an ATM switching network in which a selective routing scheme is employed for part of the traffic.

BACKGROUND OF THE INVENTION

Telecommunications networks such as telephone and packet networks are made up of many switching nodes which are interconnected by links. A call is routed from an originating node to a destination node by way of intermediate nodes through one, two, and three or more links. Generally speaking, there are two routing schemes which exist separately or co-exist in the same network, sequential routing (hierarchical routing) and/or selective routing (occasionally called "dynamic", "high-performance", or "adaptive" routing). Despite the names, both are dynamic in the sense that routing paths are dynamically adjusted to the state of links and both exhibit high performance under certain traffic conditions. Regardless of routing, when node A initiates a request to connect to node B, node B, being the host of the destination link, must first accept the request.

In the sequential routing scheme, an ordered set of routes is scanned in the search for a free end-to-end path and the first encountered free path is allocated. The widely used hierarchical routing is a special case of sequential routing, and the so-called time-of-day routing is another form of sequential routing. The sequential routing scheme is easy to implement.

In selective routing, a predefined set of routes is examined in the search for a free path. When two or more free paths are available, the path selection is based on a comparison of the states of the free paths. In a well-utilized network serving steady traffic, selective routing is marginally better than sequential routing. However, the performance or efficiency difference widens as the traffic volatility increases. Short-term volatility may be caused by variation in demand, traffic composition, etc. Long-term volatility may be caused by multi-time-zone coverage. In the multi-service network, the selective routing far outperforms the sequential routing due to traffic variability which may increase by orders of magnitude due to:

different connection bit rate ("bandwidth") allocations;
volatility of the traffic mixture; and
asymmetry of bit rate ("bandwidth") requirements for the same connection (e.g., 10 Mb/s in one direction and 1 Kb/s in the opposite direction).

U.S. Pat. No. 4,679,189 (Olson et al, Jul. 7, 1987) is an example of selective routing. The patent describes an alternate routing arrangement for packet switched networks such as those of X.25 packet standards. According to the patent, the alternate routing control information includes a destination node index code identifying the destination node. The destination node index is used as address information by each node receiving a packet to read out the stored information at the node identifying the available paths and the algorithm to be used in selecting one of these paths for use in transmitting the packet towards the destination node. The identified algorithm is then executed to select the path to be used.

The selective routing scheme requires information on the state of the relevant links and can be implemented in either of two information control schemes, a distributed or centralized routing control scheme. These control schemes will be described in a more detailed manner later. In a network of ATM switches, a separate signaling network is unnecessary since both the traffic payload and the control messages can use the same medium. In addition, it may be argued that centralized control is undesirable in such a network.

The present invention is therefore concerned with improvement in performance of an ATM network which combines the benefits of sequential routing and selective routing. This routing scheme can be conveniently called hybrid routing. The ATM network of the present invention includes a distributed routing control based on negotiations between the originating and selected intermediate nodes only. This limited control can only affect the traffic which uses a direct link, or at most two links, between origin and destination. The part of the traffic which must use three or more links to destination must then follow a predetermined routing scheme. Two-link routes serve as a catalyst that balances the traffic.

OBJECTS OF THE INVENTION

It is therefore an object of the invention to provide a method and system of routing a call in an ATM network.

It is a further object of the invention to provide a method and system of routing a call in an ATM network in which selective routing is performed by the originating node and a few intermediate nodes for certain calls.

It is another object of the invention to provide a method and system of routing a call in an ATM network in which selective routing is performed by the originating node and intermediate nodes for certain calls, and for other calls a different routing scheme is employed at the originating node and the selective routing is performed afterward.

It is yet a further object of the invention to provide a method and system of selective routing which are based on true network states and not stale or estimated state information.

It is still an object of the invention to provide a method and system of routing a call in an ATM network in which routing information is processed in parallel without conflict by more than one node in the network.

It is still a further object of the invention to provide a method and system of routing a call in an ATM network in which routing information is processed simultaneously in parallel without conflict for many links in the same node.

SUMMARY OF THE INVENTION

Briefly stated, according to one aspect, the present invention relates to a method of routing a call between an originating node and a destination node in an ATM network having a plurality of nodes wherein each node stores routing information. The method comprises steps of selecting candidate route paths from the originating node to the destination node, selecting direct route paths among the candidate route paths which require only one link to complete a connection for the call between the originating and destination nodes and granting the call a connection using one of the selected direct route paths whose routing information meets predetermined criteria. If no direct route paths are found, the method further comprises steps of selecting two-link route paths which require two links to complete a connection for the call between the originating and destination nodes, the originating node sending connection messages to candidate middle nodes located in the selected two-link route paths and each of the middle nodes storing the connection message in a respective message queue and responding to the originating node with state information when the connection message in its queue reaches the head of the queue. The method further includes steps of comparing the routing information given to the originating node by each candidate middle node, and granting the call a connection using one of the selected two-link route paths whose routing information meets predetermined criteria.

According to another aspect, the present invention is directed to a method of routing a call between an originating node and a destination node in an ATM network having a plurality of nodes wherein each node having one message queue for each of its outgoing links and a candidate table containing a list of candidate route paths to complete connections for calls requested thereat. The method comprises each node performing independently from each other without conflict, following steps of sending connection messages for calls requested thereat to appropriate nodes, and storing and processing the connection messages in its respective message queues. The method further includes each node performing further steps of selecting a route path to each destination node according to the order of preference among direct route paths, two-link route paths and multiple-link route paths, respectively requiring one, two or three or more links to complete a connection from the node to the destination node of each call and granting the call a connection using a route path whose routing parameters meet predetermined criteria.

DETAILED DESCRIPTION OF THE PREFERRED EMBODIMENTS OF THE INVENTION

For actual implementation of the selective routing, in addition to the two different control schemes, there are two different reporting methods of the network-state information. The two reporting methods are one in which the state information is periodically disseminated among the nodes and another in which the state information is given when required. Either of the two state-reporting methods can be used with either of the two control schemes.

Figure 1:
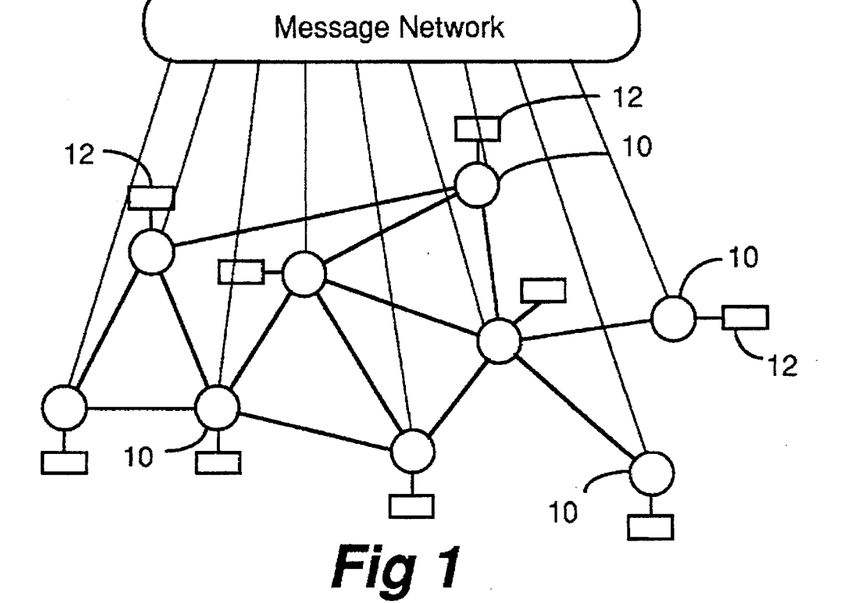
FIG. 1 is a schematic diagram of a switching network with distributed control.

In the distributed control scheme shown in FIG. 1, each node 10 of a network communicates its link-states to its connecting nodes through a messaging network. Each node has its controller 12 which stores and processes each link-state information in its routing table. The allocated path for each call is determined by the originating node on the basis of its link states and the information received from connecting nodes through some dialogue with some intermediate nodes. The control effort is therefore distributed among the participating switching nodes, requiring not much additional hardware. The scheme, however, may be tricky to implement due to difficulty in coordinating nodes and it may be difficult to distribute sufficient spatial state-information. On the other hand, functional problems in a given node freeze only parts of its routing table and would not affect the whole network.

Figure 2:
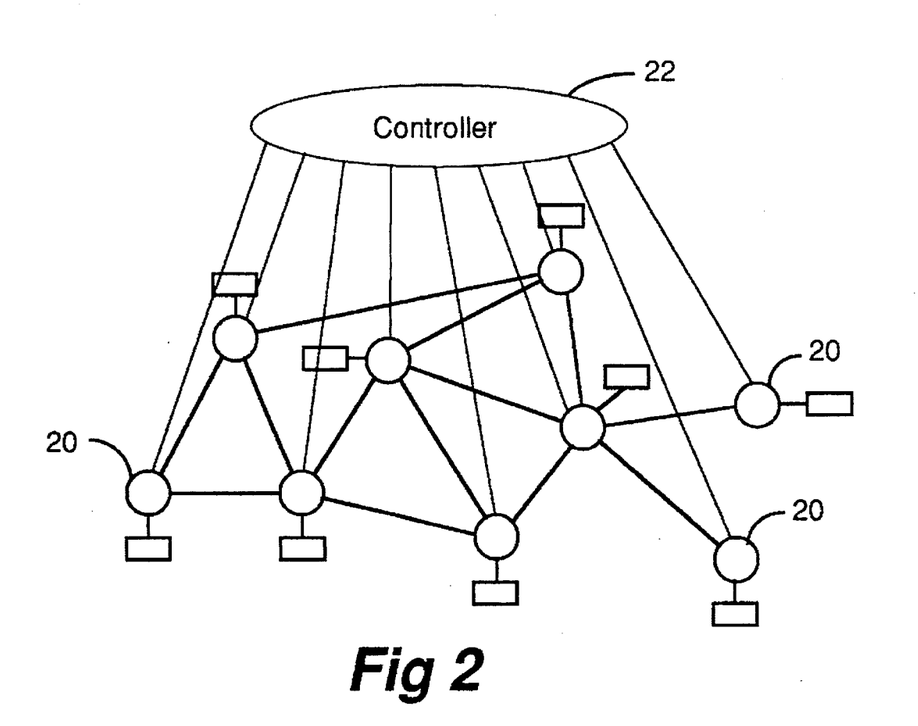
FIG. 2 is a schematic diagram of a switching network with a centralized control.

Referring to FIG. 2, the centralized control scheme involves each node 20 communicating its link state to a central controller 22 which allocates the free-path (if any) for each node pair. The central controller has complete updated spatial state information regarding the health of all links and nodes in the network. The central controller constructs a routing table and communicates the results to each node. Each node receives the preferred path to each other node. This information would typically be updated periodically. It is simple to implement but requires more additional network elements such as the controller. The controller is, however, the bottleneck and a failure in the controller freezes routing tables of all its satellite nodes.

As for the state-reporting methods, the periodical method updates links-state information at a fixed interval. The method may be simple to implement but can be wasteful because some of the information distributed across the network may not be used, although this is offset by the fact that the same information may be used for routing several calls. Because of the potential reuse of the same state information by many calls, there is a danger that wrong decisions may be made. For example, a call may be unjustly blocked when there are actually sufficient resources and vice versa. The method may be unacceptable under volatile traffic or when the ratio of connection bit-rate to link rate is high (e.g., more than 0.1).

The second reporting method involves sending link-state information when required for every call. The method may be potentially complex. Acquiring links-state information for the exclusive use of one call can result in an unacceptably high signaling load.

The end-to-end path length may vary from one link to several tandem links. In a typical network, a large proportion of the calls is routed through direct links or two-link paths. The use of fully-selective routing smoothes the traffic through the network and improves performance (or equivalently increases the capacity). The application of selective routing when the shortest route comprises more than two links, and when there are several such routes, can be quite cumbersome, particularly in a distributed-control scheme.

Figure 3:
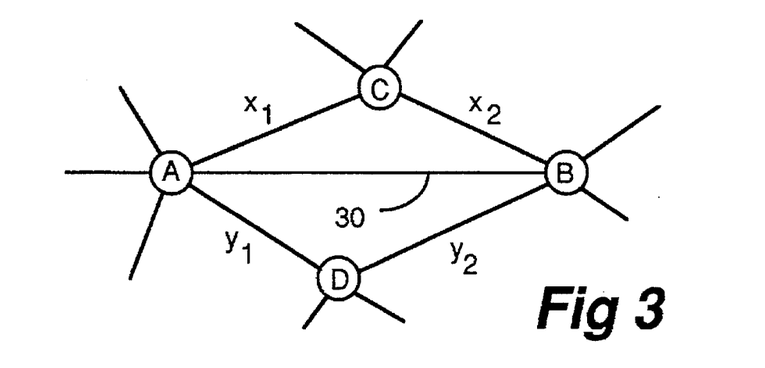
FIG. 3 illustrates nodes in a switching network showing routing paths and their link metrics to be used for a known selective routing.

FIG. 3 shows a selective routing according to prior art technology. The control scheme is a distributed routing control based on negotiations between the originating and destination nodes only. Referring to FIG. 3, if a connection between node A and node B can be routed directly, the originating node allocates a direct link 30 based on the information it has stored in its controller. In the case where a connection requires two links between nodes A to B because a direct link such as link 30 is busy or unavailable, nodes A and B are going to negotiate for the best route path between them.

For two-link routes, the usual method of selecting a route is to determine the least-loaded path. A set of two-link routes is the set of all routes having two links between the originating and destination nodes. Therefore an algorithm for the nodes to select a preferred link is as follows:

$$x = \min(x_1, x_2)$$

$$y = \min(y_1, y_2)$$

where $x_1$, $x_2$, $y_1$ and $y_2$ are respectively link metrics of links between nodes A and C, between nodes C and B, between nodes A and D and between nodes D and B.

Select route ACB if $x < y$,

Select route ADB otherwise.

This applies regardless of whether the control is centralized or distributed.

Figure 4:
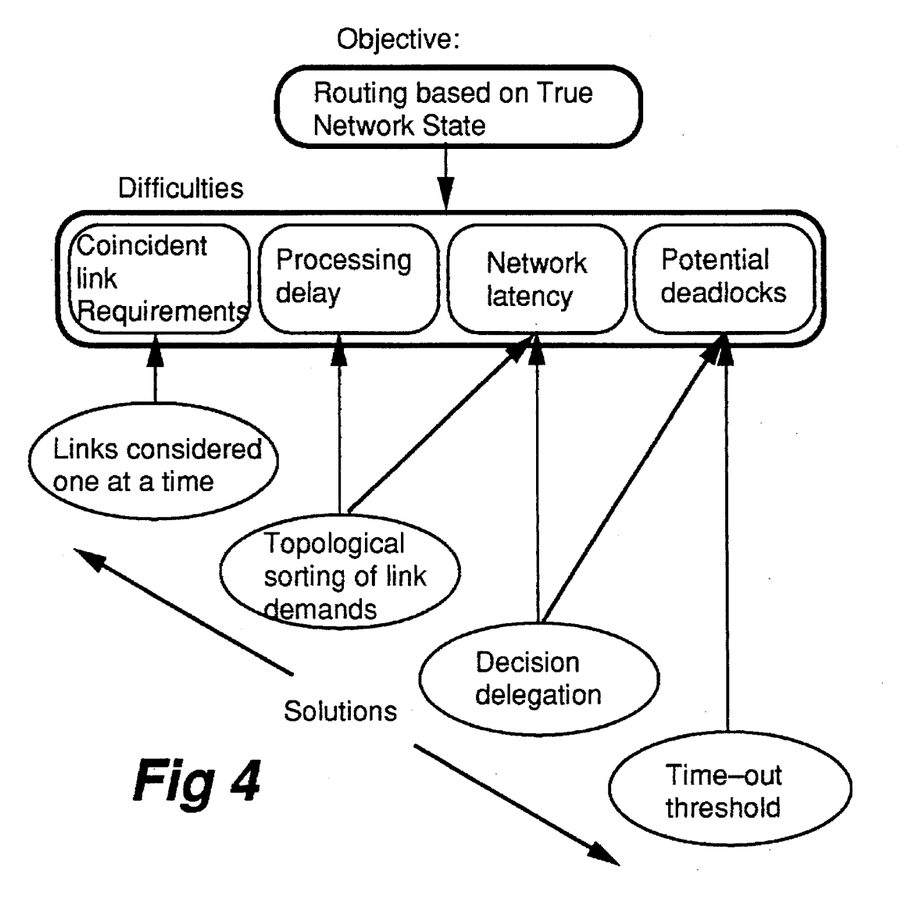
FIG. 4 shows the main concepts of the present invention.

FIG. 4 depicts the main concepts of the routing mechanism according to the invention. The novel routing mechanism realizes selective routing based on true network-state information. Since the candidate routes of two or more call requests may intersect (compete for the same link) in one or more links, the routing decisions for such calls cannot be made simultaneously. This necessitates that each link of the candidate routes for a given call must be declared unavailable to the route-selection process for any other call until a final decision is made for the call under consideration. On the other hand, in order to speedup the call-processing function at each switching node, several calls must be processed simultaneously. Simultaneous processing is also needed due to network latency which is caused mostly by the internodal propagation delay and, to some extent, by the queuing delay at the processing nodes. Simultaneous processing of non-conflicting calls (having no intersecting candidate routes) can be realized through a topological-sorting process as described below in an embodiment of the invention. This process, however, can lead to a deadlock due to the differing propagation delay. The deadlock can be removed by imposing a time-out threshold at each node. A decision-delegation process, whose main function is to reduce the routing-decision delay, can also result in reducing the incidence of deadlock. Deadlock avoidance by the use of time-out and decision delegation, will be described in detail below.

ROUTING PROTOCOL

According to the present invention, the routing procedure can be summarized as follows:

(1) As usual, a request must first be accepted by the terminating switch (destination node), based on information it has on the state of the sink (the "called-party").

(2) A direct route (one link), if any, is, of course, tried first.

(3) If a direct-route is not available, the originating switch (node) inspects the set of two-link routes. If only one such route is available, it is a candidate. If two or more are available, the originating node selects two outgoing links, either at random or following some "optimizing" rule. One such rule is to choose the least-loaded two outgoing links as shown in FIG. 3. If unsuccessful, the remaining members, if any, of the two-link set are tried.

Figure 5:
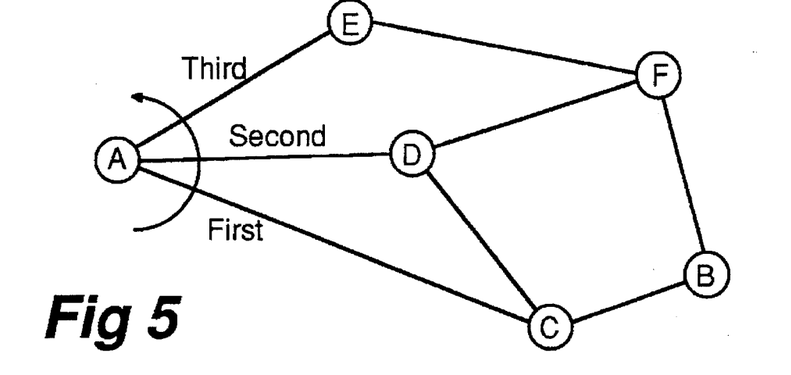
FIG. 5 illustrates nodes in a switching network showing routing paths which require two or three links and a sequential routing mechanism combined with a selective routing according to one embodiment of the invention.

(4) If a route is still not found, the sorted subset of three-link routes between originating and destination nodes is tried sequentially. For example, referring to FIG. 5, when a requested call requires three or more links to complete a connection to the destination node, a route is selected according to a predetermined order. Topological sorting of routes according to some optimizing criterion is done at the time of each network reconfiguration (i.e., not in real time). The routes from A to B are sorted according to path-length and the number of parallel paths. The originating node chooses a link to a neighboring node according to a pre-established order. The neighboring node now determines that it requires only one or two links to complete a connection from it to the destination node. If that is the case, it negotiates connection in the same way as that described in connection with the previous figures. Therefore, in FIG. 5, the first route (A, C, B) has two links. The second choice [(A, D, C, B), (A, D, F, B)] has two three-link candidate routes with parallel segments between D and B. The third choice (A, E, F, B) has three links and no parallel segments. The originating node A attempts to use links AC, AD and AE in that order. Each of the neighboring nodes is asked in the order to negotiate with some intermediate nodes for a connection to the destination.

(5) In any case, when a link is under consideration for a particular connection, it may not be considered for another connection until a decision is made on the connection in question. The link, of course, continues to carry previously admitted traffic. This requirement guards against multiple booking of any link and guarantees conflict free route assignment. Such a scheme would be unworkable in the existing networks due to the messaging delay. In a high-speed ATM network, however, the messaging delay is typically dominated by propagation delay which may vary from a few micro-seconds to a few milliseconds. The messaging delay is an insignificant addition to the connection set-up delay.

(6) The two parts of a two-way call must be processed separately due to the potential high asymmetry of the rate requirements in the two directions.

A well-designed partially selective (hybrid) routing scheme should yield results which are comparable to those realized by fully selective scheme. In such a scheme, selective-routing is applied to two-link paths and sequential routing is applied when the path length exceeds two links. The calls which use two links help in reducing the link occupancy variations caused by the random first encounter allocations of sequential routing.

The main elements of the routing scheme of the invention are listed below.

(a) Each node keeps a record of the state of its outgoing links only (it needs not be aware of the states of its incoming links).

(b) Each node maintains a queue of requests for each outgoing link.

(c) When a route is under consideration for a given connection, all its links are declared unavailable for other connections until a resolution is reached for the connection in question. This avoids potential over-booking.

(d) The route selection is decided by the originating node. However, under certain conditions, the decision may be delegated to a down-stream node to speed up the process.

(e) The node which makes the decision informs each of the relevant nodes which will either release the relevant links (i.e., make them available for further routing decisions) or update the information about their remaining capacities.

(f) Time-out controls may be enacted to resolve potential deadlocks.

(g) Request bundling may be employed to reduce the processing effort. This would normally apply to low-speed connections, such as voice traffic.

Figure 6:
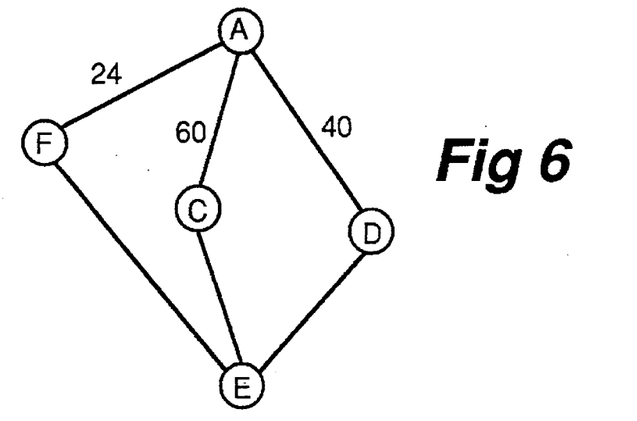
FIGS. 6 and 7 show selection of candidate routes.
Figure 7:
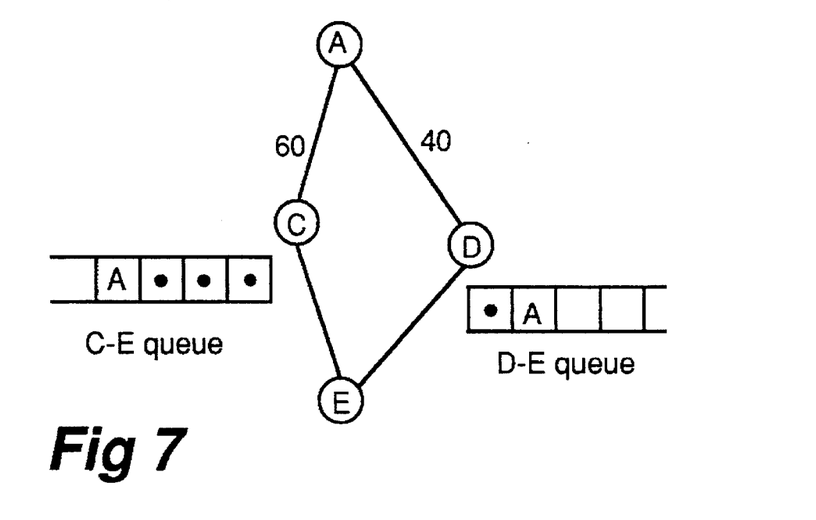

According to another embodiment of the invention, route selection (the selection of outgoing links at each node) is depicted in FIG. 6, which also indicates the available capacity of each outgoing link. In the Figure, the capacity is shown in units of bit rate and a unit, for example, may be selected as 100 bits/sec. Of course the selection of the bit-rate unit is arbitrary and other units may be employed. The connection from node A to E starts with node A selecting the links to nodes C and D, based on their available capacities. Node A sends messages to nodes C and D probing the available capacity on outgoing links to destination (CE and DE). In FIG. 7, the messages are queued at nodes C and D, respectively. When each message reaches the head of its queue and gets processed, it freezes any further decisions on the link (by simply staying at the head of the queue) and applies the CAC (connection admission control) criterion. Each of nodes C and D sends a message back to the originating node with the required state information. When node A receives the information from both nodes C and D, it makes a decision. If it selects route ADE, node A will advance its AC queue pointer, then send a message to node C allowing it to advance the CE queue pointer. Node A will also update the state of link AD and send a message to node D asking it to update the state of link DE (by subtracting the equivalent bit-rate of the connection from the currently available capacity). When the call is released later, node A updates the available capacity of link AD and requests node D to update the available capacity of link DE.

Decision Delegation

Figures 8, 9:
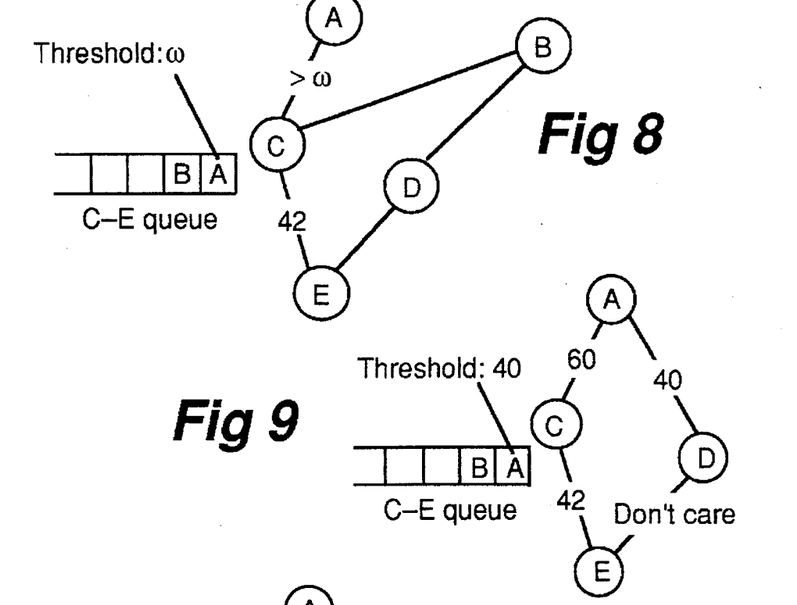
FIGS. 8 and 9 show delegation of routing path selection to speed up call admission.

Consider a request for a connection of a given EBR (equivalent bit rate) $\omega$ from node A to node E. In FIG. 8, node A has only one available link to node C. Node A can then authorize node C to accept or reject the request. The decision would be based on the available capacity of link CE. When there are two paths to destination, the originating node would authorize the node at the end of the link of larger available capacity to make the decision conditional on a given threshold. In FIG. 9, messages are sent from node A to nodes C and D to establish a connection from node A to node E as described above. However, since link AC has a higher available capacity in comparison with link AD (60 units vs. 40 units), node C would be authorized to handle the AE connection request, if the CE available capacity exceeds 40 units. The delegation may reduce the call set-up delay and messages and may even resolve a deadlock as will be explained below. In the example of FIG. 9, link CE has 42 units available and hence the delegation is successful.

Message Aggregation

Message aggregation for same origin/destination speeds up the process and makes room for optimization. When some calls have to be blocked anyway, they can be selected on the basis of call-type classification.

Deadlock Avoidance

Figure 10:
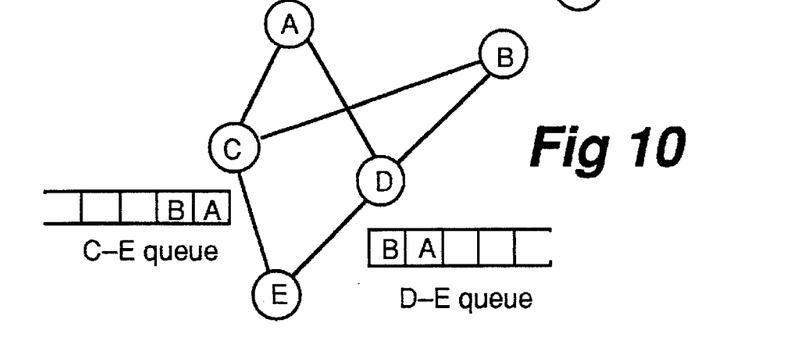
FIGS. 10 and 11 show, respectively, a deadlock of the network and removal of deadlock by delegation.
Figure 11:
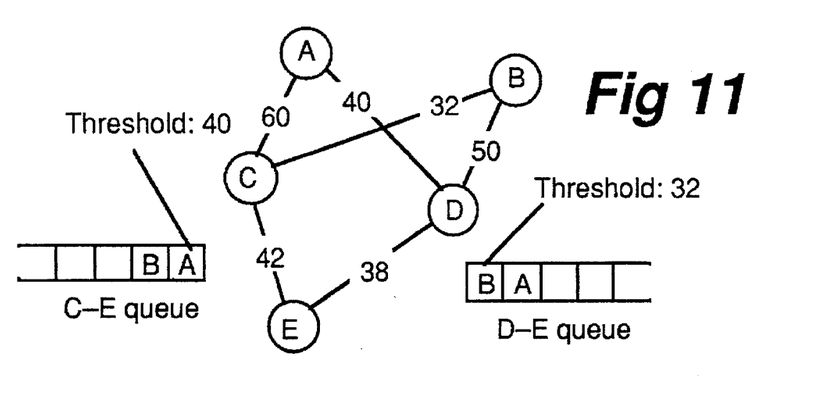

Due to the difference in propagation delay, messages from two or more calls which are competing for common links may be transposed and lead to a deadlock. In FIG. 10, for example, two connection requests from A to E and from B to E are generated within a short interval. Nodes A and B send messages to C and D according to the rules of the protocol. Due to the differences in the propagation delays, the messages are queued in the opposite order at C and D. At C, the message from A is processed and the result is sent back to A. Likewise, at D, the message from B is processed and the result is sent to B. Node C will not advance the queue pointer unless it gets an "all clear" from node A. A candidate route is said to be "all clear" when it is either assigned or abandoned, but not in a decision-waiting state. Node A, however, is waiting for the result of its message to D, which is not forthcoming since the message is stuck at node D in the DE queue. Node D will not advance the DE queue pointer unless it receives clearance from node B, which is waiting for a reply from node C, which is not forthcoming since the message is stuck at node C in the queue for link CE. Although this situation may occur with a very small probability, it cannot be tolerated. The deadlock can be resolved by a time-out which will force one of the two connections to yield and accept a decision to be made without the benefit of a comparative selection. The two requests may time-out simultaneously and the routing decision for each request would then be based on the information already available at its respective originating node. The delegation feature described above may result in resolving a deadlock without the brute-force time-out. For example, in FIG. 11, node A delegates to node C and node B delegates to node D (on the basis of available link capacity). If either of the delegations is successful, the deadlock is removed automatically without sacrificing the selectivity.

Processing Load

Figure 12:
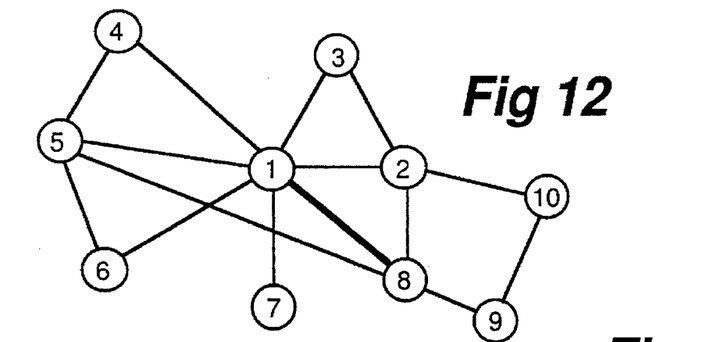
FIG. 12 shows a network example to illustrate parallel (simultaneous) processing of routing information according to one embodiment of the invention.
Figure 13:
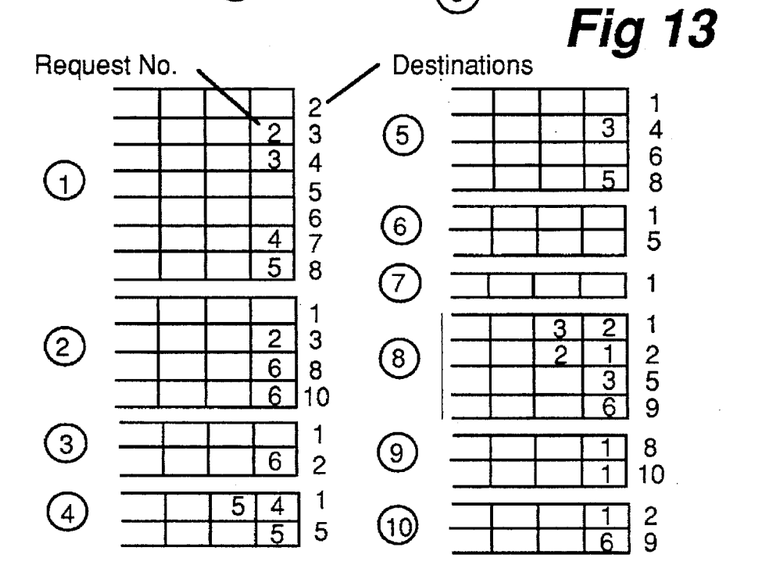
FIG. 13 shows queued routing messages at each node shown in FIG. 12, with an inherent simple topological sorting.
Figure 14:
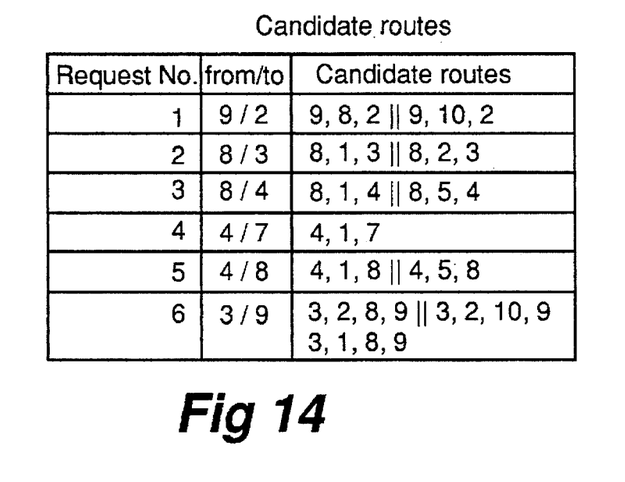
FIG. 14 is a table showing candidate routes.

With several links emanating from each node, it would be impractical to process one call at a time, given the propagation delay between nodes, which may vary from a few microseconds to a few milliseconds. Under heavy load, the message queuing delay may be high, as the message at the head of the queue awaits a reply, and cell set-up delay may be unacceptable. The present invention permits independent processing of routing information by each node. To allow for simultaneous processing, while guaranteeing conflict-free decisions, the queue at each switch would be logically divided so as to appear as a number of queues, each serving one of the outgoing links. In the network of FIG. 12, for example, the queues at each node would be divided as shown in FIG. 13. In FIG. 12 the outgoing and incoming links of a node-pair are shown in one line for clarity. FIG. 13 shows a queue for each outgoing link at each node (no queues for incoming links). FIG. 14 lists a number of requests under consideration and the corresponding candidate route. In FIG. 14, request number 1 is for a call from node 9 to node 2. The call may use either of the paths (9-8-2) or (9-10-2). Node 9 enters request number 1 in its queue of link 9-8 and its queue of link 9-10. When node 9 sends messages to nodes 8 and 10, node 8 enters request number 1 in its queue for link 8-2 and node 10 enters request number 1 in its queue for link 10-2. In FIG. 13, the messages at the head of any queue are independent and can be processed in any order, since their resource requirements do not intersect. The queue pointer for any link is advanced once the call corresponding to the message at the head of the queue is processed to completion and an "all clear" message is issued.

In FIG. 12, the connection from node 9 to node 2, for example, may be completed through nodes 8 or 10. If both the 9-8 and 9-10 links are available (each having sufficient free capacity for a given request), the two links are declared busy and messages are sent from node 9 to nodes 8 and 10. When the messages reach the head of their respective queues, links 8-2 and 10-2 will be declared unavailable until the decision is made either by node 9, or by one of the intermediate nodes 8 or 10 through delegation, if applicable. As seen from FIG. 13, the request number (1 in this case) is entered in queues 9(8), 9(10), 8(2), and 10(2). The head entries of the node 8 queues show that links 8-1 (for request No. 2), 8-2 (for request No. 1), 8-5 (for request No. 3), and 8-9 (for request No. 6) can be investigated independently. Request numbers which appear in the same row (same queue) are intersecting (conflicting, i.e., interdependent), and cannot be processed simultaneously or independently, since their candidate paths intersect in that link. For example, request numbers 2 and 3 have candidate paths (8-1-3) and (8-1-4) which intersect in link 8-1. In FIG. 12, this link is shown by a heavy line for emphasis. This fact is manifested in FIG. 13 where request number 3 can only proceed when an "all clear" is issued for request number 2. A similar condition exists for request numbers 4 and 5 in link 4-1 and request numbers 1 and 2 in link 8-2. Therefore, the potential use of link 8-2 for request number 2, for example, can only be investigated after request number 1 is cleared (routed or rejected).

The above-described routing scheme realizes a high accuracy and a high speed of processing. The development of this routing scheme is motivated by a number of factors:

(1) sequential routing may not be efficient with highly-volatile traffic;

(2) selective routing based on stale link-state information works well in the voice network but is not adequate in the multiservice network due to the high variance of the connections' bits rates; and (3) the high-speed messaging facility of the broadband network offers an opportunity of fast exchange of link-state information, and hence more effective routing.

The following observations can be made regarding the partially selective (hybrid) routing of the invention.

A) Path length may vary from one link to several tandem links.

B) In a typical network, most calls are routed through a direct link or two-link paths.

C) Fully selective routing applied to all path lengths smoothes the traffic through the network and improves performance (or increase capacity).

D) Using a combination of the selective routing, for paths of one or two links, and sequential routing when the path length exceeds two links should yield good results close to those realized by fully selective routing (for all path lengths). The two-link calls help in reducing the link-occupancy variations caused by the random first-encounter allocations of other calls.

E) Partially selective routing requires the participation of only the originating and a few intermediate nodes.

What is claimed is:

1. A method of routing a call between an originating node and a destination node in an ATM network having a plurality of nodes wherein each node stores routing information, comprising steps of:

selecting candidate route paths from the originating node to the destination node;

selecting direct route paths among the candidate route paths which require only one link to complete a connection for the call between the originating and destination nodes;

granting the call a connection using one of the selected direct route paths whose routing information meets predetermined criteria;

if no direct route paths are found, selecting two-link route paths which require two links to complete a connection for the call between the originating and destination nodes;

the originating node sending connection messages to candidate middle nodes located in the selected two-link route paths;

each of the middle nodes storing the connection message in a respective message queue and responding to the originating node with state information when the connection message in the queue of the middle node reaches the head of the queue;

comparing the routing information given to the originating node by each candidate middle node; and granting the call a connection using one of the selected two-link route paths whose routing information meets predetermined criteria.

2. The method of routing a call between an originating node and a destination node in an ATM network according to claim 1 wherein the routing information stored in each node comprises routing table and state information of each link emanating therefrom and the step of granting the call a connection includes a step of deciding on one of the route paths in view of the least link metrics based on the state information of each link.

3. The method of routing a call between an originating node and a destination node in an ATM network according to claim 2 wherein the originating node sends a connection message to one of the middle nodes indicating a threshold value of link metric required to complete a connection; and said one of the middle nodes completes a connection therethrough to the destination node if the link between said one of the middle nodes and the destination node meets the threshold value.

4. The method of routing a call between an originating node and a destination node in an ATM network according to claim 2 comprising a further step of imposing a time-out to each of the middle nodes of the selected two-link route paths so that after such time-out the connection message in the queue will be discarded.

5. The method of routing a call between an originating node and a destination node in an ATM network according to claim 3 wherein, if no two-link route paths are found, the method comprises further steps of:

the originating node determining that the call requires three or more links to complete a connection to the destination node;

the originating node selecting a link to a neighboring node according to its pre-established order of preference;

the neighboring node selecting direct or two-link route paths which require one or two links to complete a connection for the call between the neighboring node and the destination node; and granting the call a connection using one of the route paths whose routing information meets a predetermined criterion in the order of the preference from a direct to two-link route paths.

6. The method of routing a call between an originating node and a destination node in an ATM network according to claim 5 wherein:

each of the nodes has one message queue for each of its outgoing links and a candidate table containing a list of candidate route paths to complete connections for calls requested thereat; and each node processes its queues to respond to the originating node of each call independently from the other nodes.

7. The method of routing a call between an originating node and a destination node in an ATM network according to claim 6, wherein each node processes its queues to respond to the originating node of each call in such a way that the connection messages at the heads of the queues seek non-conflicting state information to complete the calls independently from the other queues of the same node.

8. The method of routing a call between an originating node and a destination node in an ATM network according to claim 7 wherein the queues at each node are logically partitioned in a memory.

9. A method of routing a call between an originating node and a destination node in an ATM network having a plurality of nodes wherein each node having one message queue for each of its outgoing links and a candidate table containing a list of candidate route paths to complete connections for calls requested thereat, comprising each node performing independently from each other following steps of:

sending connection messages for calls requested thereat to appropriate nodes;

storing and processing the connection messages in its respective message queues;

selecting a route path to each destination node according to the order of preference among direct route paths, two-link route paths and multiple-link route paths, respectively requiring one, two or three or more links to complete a connection from the node to the destination node of each call; and granting the call a connection using a route path whose routing parameters meet predetermined criteria.

10. The method of routing a call between an originating node and a destination node in an ATM network, according to claim 9 wherein:

if no direct route paths are found, the method comprises further steps of:

selecting two-link route paths and sending a connection message to middle nodes located in the selected two-link route paths;

each of the middle nodes storing the connection message in a respective message queue and responding to the originating node with routing information when the connection message in its queue reaches the head of the queue;

comparing the routing information given to the originating node by each middle node; and granting the call a connection using one of the selected two-link route paths whose routing information meets predetermined criteria.

11. The method of routing a call between an originating node and a destination node in an ATM network according to claim 10 wherein the originating node sends a connection message to one of the middle nodes indicating a threshold value required to complete a connection; and said one of the middle nodes completes a connection therethrough to the destination node if the link between said one of the middle nodes and the destination node meets the threshold value.

12. The method of routing a call between an originating node and a destination node in an ATM network according to claim 11 wherein:

if no two-link route paths are found, the method comprises further steps of:

the originating node determining that the call requires three or more links to complete a connection to the destination node;

the originating node selecting a link to a neighboring node according to its preestablished order of preference;

the neighboring node selecting direct or two-link route paths which require one or two links to complete a connection for the call between the neighboring node and the destination node; and granting the call a connection using one of the route paths whose routing information meets a predetermined criterion in the order of the preference from a direct to two-link route paths.

13. The method of routing a call between an originating node and a destination node in an ATM network according to claim 10 wherein the originating node sends a connection message to the middle nodes, one of which grants the call a connection after a predetermined time-out period has elapsed.

14. The method of routing a call between an originating node and a destination node in an ATM network according to claim 10 wherein each of the nodes has one message queue for each of its outgoing links and a candidate table containing a list of candidate route paths to complete connections for calls requested thereat, and each node processes its queues to respond to the originating node of each call independently from the other nodes.

15. The method of routing a call between an originating node and a destination node in an ATM network according to claim 14, wherein each node processes its queues to respond to the originating node of each call in such a way that the connection messages at the heads of the queues seek non-conflicting state information to complete the calls independently from the other queues of the same node.

* * * * *